United States Patent [19]
Barro

[11] Patent Number: 5,603,440
[45] Date of Patent: Feb. 18, 1997

[54] STRUCTURE FOR THE PARCEL CARRIER OF A BICYCLE

[75] Inventor: Marino Barro, Treviso, Italy

[73] Assignee: F.LLi Barro Giovanni & Luigi S.r.l., Treviso, Italy

[21] Appl. No.: 307,074

[22] Filed: Sep. 16, 1994

[30] Foreign Application Priority Data

Sep. 17, 1993 [IT] Italy .................................. PN93A0060

[51] Int. Cl.⁶ ........................................................ B62J 9/00
[52] U.S. Cl. .......................... 224/452; 224/441; 224/457
[58] Field of Search ...................... 224/32 A, 37, 224/39, 38, 412, 419, 422, 428, 441, 451, 452, 453, 457

[56] References Cited

U.S. PATENT DOCUMENTS

| | | | |
|---|---|---|---|
| 2,537,441 | 1/1951 | Burri | 224/32 A |
| 4,117,962 | 10/1978 | Pletscher | 224/37 |
| 4,154,382 | 5/1979 | Blackburn | 224/39 |
| 4,261,491 | 4/1981 | Schroeder | 224/422 |
| 4,383,625 | 5/1983 | Kiang | 224/452 |
| 4,666,071 | 5/1987 | Irwin et al. | 224/452 |

FOREIGN PATENT DOCUMENTS

| | | | |
|---|---|---|---|
| 869567 | 2/1942 | France | 224/32 A |
| 869817 | 2/1942 | France | 224/32 A |
| 938051 | 9/1948 | France | 224/32 A |
| 983825 | 6/1951 | France | 224/32 A |

*Primary Examiner*—Henry J. Recla
*Assistant Examiner*—Gregory M. Vidovich
*Attorney, Agent, or Firm*—Wenderoth, Lind & Ponack

[57] ABSTRACT

The framework of a parcel carrier for bicycles is fashioned from lightweight metal rods of plain round section. The framework has a rectangular top frame-formed of two lateral members, a forward transverse member and a rear transverse member, and, extending downward and convergently from the forward and rear ends of the lateral members, respective pairs of forward members and rear members connected to one another at the bottom ends thereof and securable to the usual bottom anchorages afforded by a bicycle frame. The rectangular top frame is the peripheral member of a shelf which incorporates two further members within the top frame. These members are secured at their forwardmost ends to the middle of the forward transverse member, which coincides with the top anchorage and extend rearwards symmetrically and divergently to terminate at rear ends positioned adjacent and secured to the rear ends of-the lateral members. The members of the framework thus create a structure characterized by non-deformable lattice elements from which the parcel carrier derives notable rigidity and strength.

11 Claims, 3 Drawing Sheets

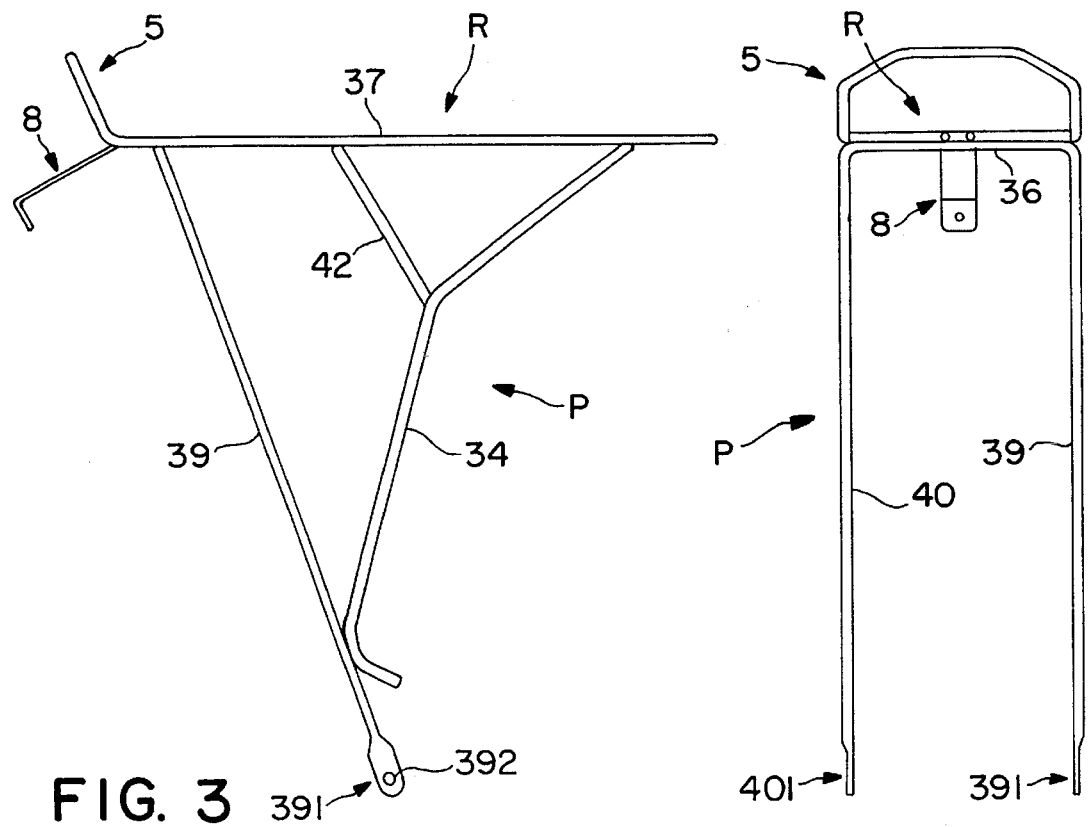
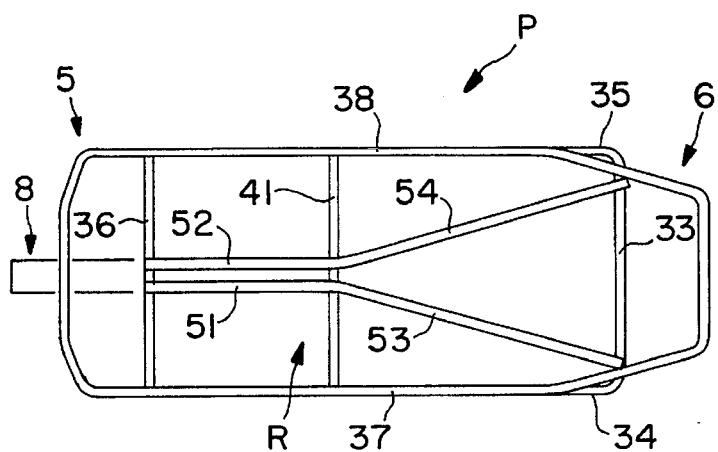

STRUCTURE FOR THE PARCEL CARRIER OF A BICYCLE

BACKGROUND OF THE INVENTION

The present invention relates to a special structure for the parcel carrier of a bicycle, which is lightweight while affording notable strength and rigidity. Conventional parcel carriers for bicycles include a variety of types, of which the most common are those mounted to the rear end of the bicycle.

Normally, the structure of such a parcel carrier will consist of a framework affording a horizontal uppermost shelf, positionable over the rear wheel of the bicycle, and on which objects to be transported can be placed and secured.

The framework is secured detachably to the bicycle by way of the forwardmost part of the shelf in a position beneath the backwardmost part of the saddle, utilizing a variety of familiar methods and means, and fastened, by way of appropriate fittings incorporated into the ends of at least two lateral members extending downward from the shelf, to corresponding anchor lugs afforded generally by the two rear angled struts of the bicycle frame near to the rear wheel axle slots.

There has been an increasingly discernible trend over time toward parcel carriers of this same type in which the overall weight is limited by fashioning the entire framework from metal rod, preferably of aluminum or another light alloy. Conventional structures embodied in this way normally afford limited rigidity and strength only, and indeed the forwardmost lateral members or arms, which operate under compressive stress, are unable by reason of their appreciable length to support combined compressive and bending loads of any consequence and cannot prevent the normal transverse stresses from eventually generating considerable and undesirable lateral oscillations and roll through the structure as a whole.

To obtain at least a limited increase in strength, the part of the framework constituting the shelf can be fitted with two or more lateral members and reinforced with transverse and/or longitudinal elements disposed in a variety of ways within the peripheral rectangular structure of the shelf proper.

This type of expedient neither prevents the transverse oscillations nor eliminates roll, however, or at least will do so only to a limited extent.

Attempts have been made to overcome such drawbacks, for example by adoption of a parcel carrier as disclosed in U.S. Pat. No. 4,154,382 (Blackburn). In this carrier, the rectangular element of the shelf is attached to no less than three members. The two forwardmost members each consist of a rod bent into a square U-shape and disposed with their respective transverse portions secured at intermediate positions on the shelf to the two longer sides of the rectangular frame. The third member consists of a rod bent into a V-shape of which the apex is directed upwards and secured centrally to the shorter rear side of the rectangular frame.

The shape of this third member, i.e. the V-shape, is designed essentially to incorporate components into the overall framework that will delimit tetrahedral structural elements which, by virtue of their geometry, should be non-deformable and thus prevent the aforementioned unwanted transverse oscillations.

In practice, the rear wheel has to revolve between the two divergent parts of the third member, which ideally would form a perfect Vee, and to revolve, moreover, at a point near to what should be the vertex of these two same parts. Accordingly, the vertex must have a discernible horizontal portion, so that the resulting structure does not form an exact triangle in relation to the anchorages but a quadrilateral, and is therefore still deformable to some degree.

The structure thus obtained is consequently more robust and rigid than traditional types but only to a limited extent.

SUMMARY OF THE INVENTION

An object of the present invention is to overcome the drawbacks and limitations described above, namely to provide a framework of a parcel carrier that is rigid and not subject to lateral oscillations or roll. To achieve this object, the framework of the parcel carrier is configured of tetrahedral structures formed of non-deformable triangular lattice members from which the framework derives rigidity and strength.

BRIEF DESCRIPTION OF THE DRAWINGS

A fuller appreciation of these and other features and advantages of the invention will emerge more clearly from the following description of the working principle and of a preferred embodiment thereof illustrated by way of example by the accompanying drawings, in which:

FIGS. 3, 4 and 5 are a side elevation view, a plan view, and a front view of the framework, respectively.

It is to also be noted that the same parts are indicated by like reference numerals throughout the drawings.

DETAILED DESCRIPTION OF THE PREFERRED EMBODIMENT

Figure 1:
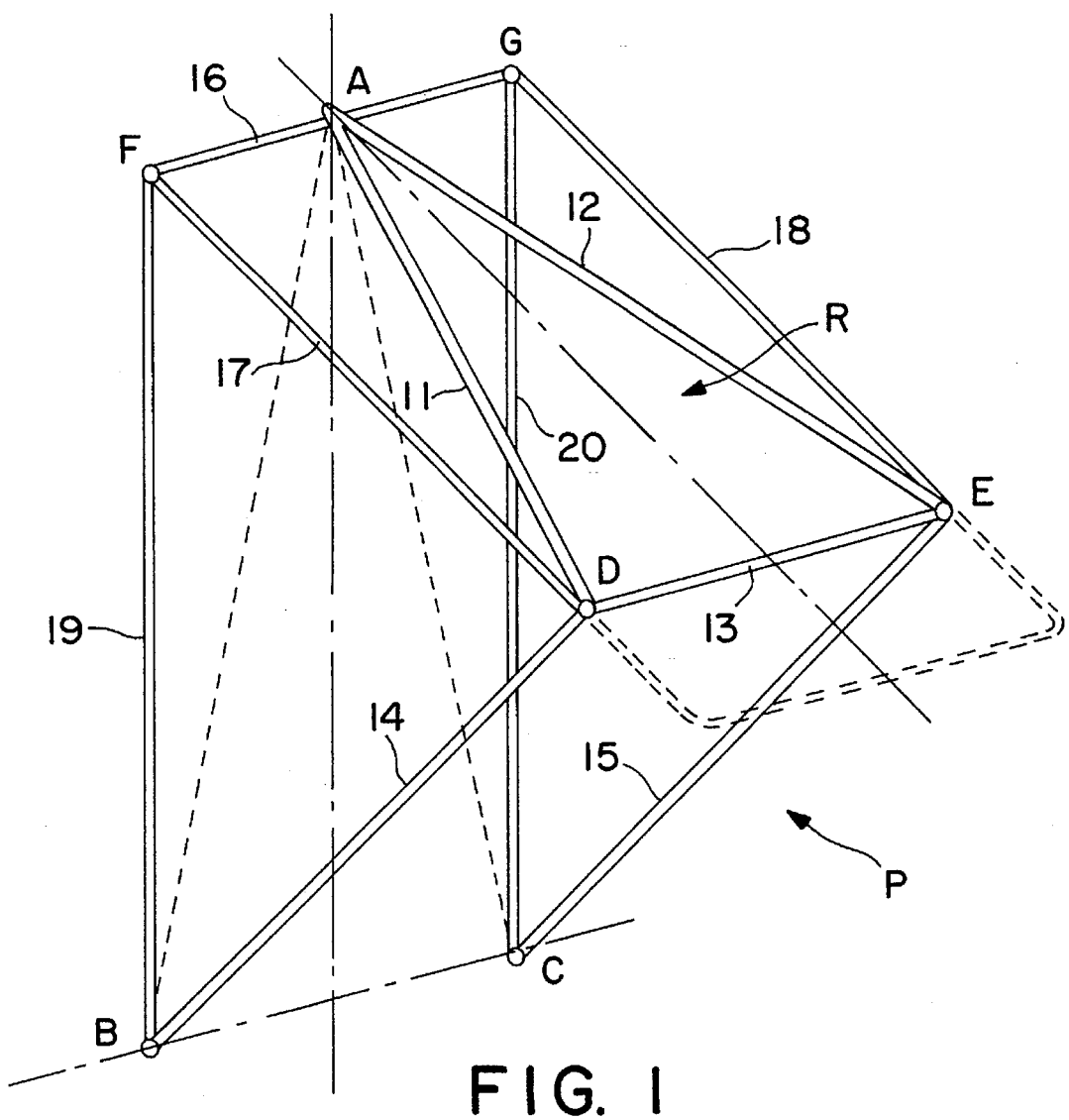
FIG. 1 is a perspective view of the basic geometry of the framework of a parcel carrier for bicycles according to the present invention.
Figure 2:
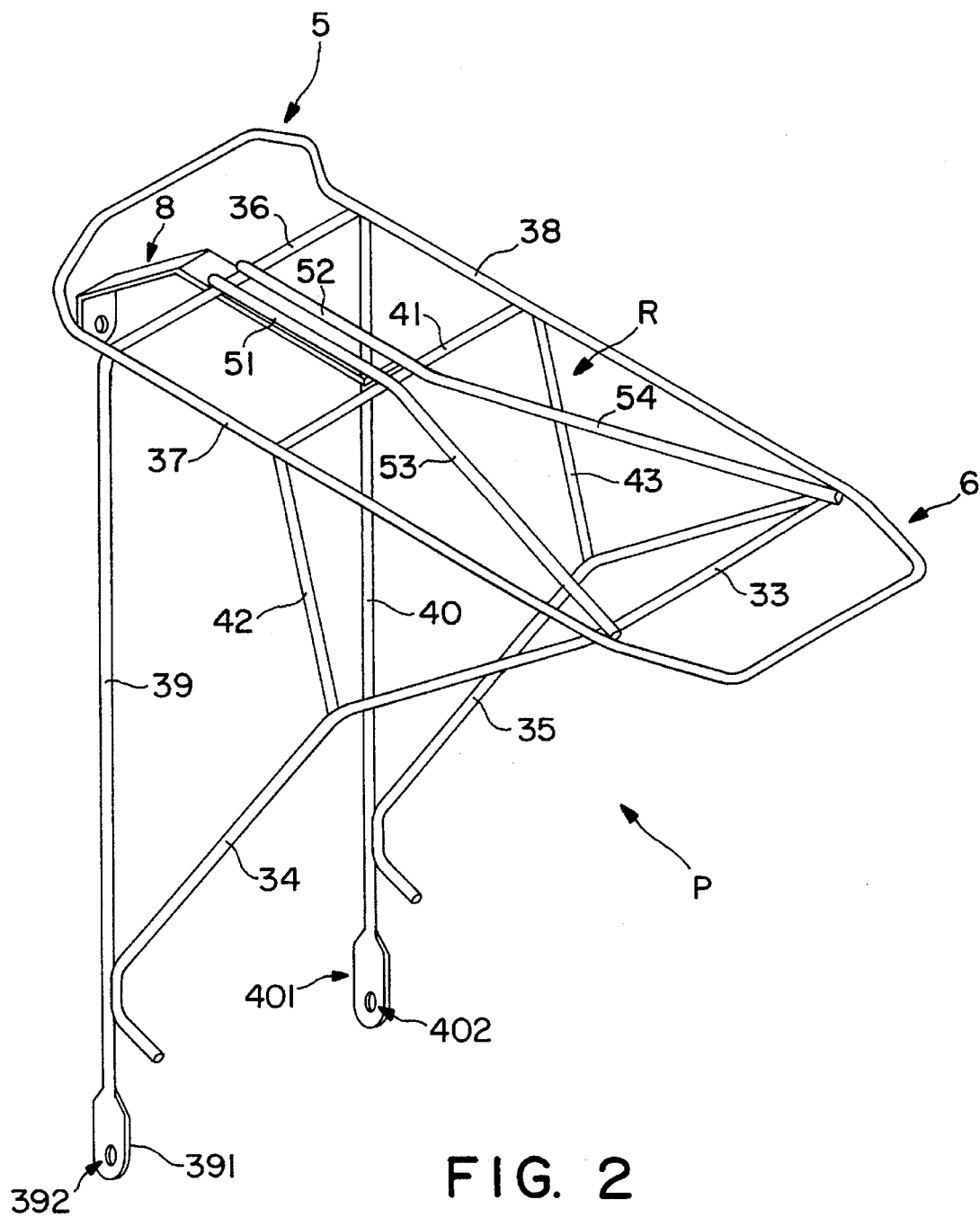
FIG. 2 is a perspective view of a parcel carrier for bicycles according to the present invention.

With reference in particular to FIG. 1, the anchorages normally afforded by the frame of a bicycle include: a top anchorage A of varying shape and form located near, below and immediately beneath the saddle, and which typically might coincide with the rear brake mounting or utilize some other such similarly conventional arrangement, and two bottom anchorages B and C consisting generally of two lugs integral with the two rear struts of the bicycle frame near the rear wheel axle slots.

These anchorages A, B and C afford the points at which a basic structure of the carrier, indicated in FIG. 1 with bold lines for the sake of clarity, is attached to the bicycle. The overall structure of the complete parcel carrier is fashioned from suitable lengths of metal having a round cross section and arranged in such a way as to form lattice members of superior rigidity, as will be described in due course.

As clearly discernible, the uppermost part of the basic structure comprises a first such lattice member in the shape of an isosceles triangle formed by two lateral inner members 11 and 12 of equal length connected at the forwardmost ends thereof both to one another and to the top anchorage A; the two members extend horizontally and in symmetrical divergence rearward from the top anchorage A and are attached at the respective rear ends thereof by a third and transversely disposed member 13 at points denoted D and E. Two further, rear lateral members 14 and 15 extend downwards from points D and E substantially parallel to one another, and angled forward in such a manner as to connect at their respective lower ends with the bottom anchorages B and C. The resulting pentahedral structure presents a rear face BDEC of rectangular and therefore deformable geometry, and affords two lateral triangular faces ABD and ACE and a top triangular face ADE which, by contrast, are non-deformable and render the entire structure practically non-deformable likewise.

Also, associated with the rigid basic structure thus far described is a further structure designed to complete the overall structure of the parcel carrier.

The further structure in question, which is indicated by the fainter lines of FIG. 1 for clarity, consists of a forward transverse member 16 substantially identical in length and disposed parallel to the rear transverse member 13; two further lateral members 17 and 18 disposed externally and mutually parallel, and extending rearward at right angles to the forward transverse member 16 from the opposite ends F and G of the forward transverse member 16, and of which the rear ends are connected, respectively, to the ends of the rear transverse member 13 at points D and E; and two further, forward lateral members 19 and 20, extending likewise mutually parallel from the opposite ends of the forward transverse member 16, i.e. from points F and G, in this instance downwards, and the respective bottom ends of which are connected with the corresponding bottom ends of the rear lateral members 14 and 15 at points B and C.

As a result, the parcel carrier has two further symmetrical lattice members forming two tetrahedrons, a first one of which comprises the four triangular faces denoted ADF, FDB, AFB and ADB, and the second one comprising the triangular faces denoted AEG, GEC, AGC and AEC.

Naturally, these two additional tetrahedral structures are also composed of triangular, hence non-deformable lattices, and are therefore likewise non-deformable. Accordingly, the entire structure of a parcel carrier denoted P will thus be characterized by a notable rigidity which, when compared with traditional structures, prevents or at least markedly reduces transverse oscillations of the rear end and the aforementioned roll.

It will be noted that the peripheral rectangular frame formed by the forward and rear transverse members 16 and 13 and the lateral outer members 17 and 18, along with the lateral inner members 11 and 12, provide the shelf, denoted R, on which objects for transportation can be positioned and secured in a conventional manner and by conventional means.

The shelf R naturally could comprise additional inner transverse or longitudinal elements serving to augment the supporting surface to suitable advantage, and might be suitably extended with parts projecting in whatever manner and exhibiting any given shape as indicated by way of example in FIG. 1 with phantom lines.

Various parcel carriers can therefore be obtained, which implement the geometry described above. In the preferred embodiment of FIGS. 2, 3, 4 and 5, accordingly, the parcel carrier P comprises a shelf R appearing in the traditional manner as a frame-like structure fashioned from suitable metal rods of round section.

The shelf R comprises a substantially rectangular central portion of two parallel sides 37 and 38 which correspond to the lateral outer members 17 and 18, and a front crosspiece 36 and a rear crosspiece 33 which correspond to the forward and rear transverse members 16 and 13, a suitably contoured and upwardly bent front portion 5 extending from the forwardmost end of the central portion, and a suitably contoured rear portion 6 extending from the opposite end of the central portion and occupying the same plane as the central portion of the shelf R. The front crosspiece 36 constitutes the transverse part of a first element, consisting of a metal rod of round section bent into a U-shape, and having parallel sides 39 and 40 corresponding to the lateral forward members 19 and 20 of FIG. 1. The sides 39 and 40 are directed downward in such a way as to function as a first forward pair of arms terminating at their bottom ends in respective flat pieces 391 and 401 affording relative holes 392 and 402 by way of which the structure of the parcel carrier P can be secured in its entirety, utilizing conventional means, to the lugs (corresponding to the two bottom anchorages B and C in the case of the basic structure illustrated in FIG. 1). The lugs, as already mentioned, will normally be afforded by the rear struts of the bicycle frame at points near to the slots accommodating the rear wheel axle.

The rear crosspiece 33 in its turn constitutes the transverse part of a second element, also consisting of a metal rod of round section bent into a U-shape, and having parallel sides 34 and 35, which correspond to the rear lateral members 14 and 15 of FIG. 1. These sides 34 and 35 function as a second rear pair of arms directed downward and angled toward the corresponding forward arms afforded by the sides 39 and 40 of the first element, in such a manner that the free ends of the second pair of arms can be connected to the first pair of arms at points adjacent to the free ends of the latter.

The shelf R is strengthened further by a third element consisting of a metal rod of round section bent into U-shape and having a transverse part formed by an intermediate crosspiece 41, occupying a position between the forward and rear crosspieces 36 and 33 and attached at its ends to the two parallel sides 37 and 38, and parallel sides 42 and 43 which constitute a third, intermediate pair of arms connected at their free ends to intermediate points on the corresponding parallel sides 34 and 35 forming the second, rear pair of arms.

The intermediate and forward crosspieces 41 and 36 are positioned comparatively close to another, and the shelf R comprises two further lengths (elements) of round metal rod, fixed to and interconnecting the respective central parts of these same two crosspieces 41 and 36; the two elements in question are symmetrically disposed in relation to the longitudinal axis of the structure (FIG. 4), spaced apart at a suitable distance one from another, and comprise mutually parallel portions 51 and 52 extending between the two crosspieces 36 and 41 and symmetrically divergent portions 53 and 54 running rearwards and terminating at points coinciding with the connections between the rear crosspiece 33 and the parallel sides 37 and 38 of the shelf.

The parallel portions 51 and 52 provide a means of attachment for a conventional fixing element 8 by which the parcel carrier can be secured to the rear brake anchorage of the bicycle (coinciding with point A of the basic structure as illustrated in FIG. 1).

For the sake of clarity, the fixing element 8 is indicated by faint lines in FIGS. 2, 3, 4 and 5.

Other configurations might of-course be adopted, allowing connection to a range of different but similarly conventional anchorage systems.

Plainly enough, the structure formed by the peripheral members 36, 37, 38 and 41 and the parallel portions 51 and 52 is essentially rigid and non-deformable, and the divergent portions 53 and 54 correspond in practice to the inner members 11 and 12 of FIG. 1.

Consequently, the resulting structure is substantially equivalent to that described previously and illustrated in FIG. 1, and the parcel carrier P thus embodied has that same superior rigidity as will effectively prevent transverse oscillation and eliminate roll. It will be appreciated that variations, changes and modifications might be made to the parcel carrier of the present invention, within the true spirit and scope of the invention as defined by the appended claims.

I claim:

1. A framework of a parcel carrier for a bicycle having a bicycle frame including rear struts defining slots at bottom ends thereof and lugs adjacent the slots, respectively, a rear wheel having an axle received in the slots, and a saddle mounted to the frame, and the carrier being attachable to a rear end of the bicycle at a top anchorage afforded by the bicycle frame under the saddle, and at two bottom anchorages consisting of the lugs located at the lower ends of the rear struts of the bicycle frame near to the rear wheel axle slots, the framework comprising: a substantially rectangular top frame consisting of two mutually parallel side lateral members each having first and second opposite ends, and a forward transverse member and a rear transverse member disposed mutually parallel to one another and extending at right angles to said side lateral members, said forward transverse member connecting said side lateral members at the first ends thereof, and said rear transverse member connecting said side lateral members at the second ends thereof, each of said front and said rear transverse member having opposite ends; a first pair of substantially parallel lateral forward members each having an upper end extending downwards, respectively directly from the opposite ends, of the forward transverse member and intersecting said first end of said side lateral member at an acute angle, each of said forward lateral members having a bottom end including means for attaching the carrier to a respective one of the bottom anchorages; a second pair of substantially parallel lateral rear members each having an upper end extending downwards, respectively, directly from the opposite ends of the rear transverse member and intersecting said second end of said side lateral member at an acute angle, said lateral rear members converging toward and connecting with bottom ends of the lateral forward members; and two lateral inner members disposed within the rectangular top frame, said lateral inner members having forwardmost ends at which the lateral inner members are secured to the forward transverse member at a central portion of the forward transverse member, and said lateral inner members diverging while extending in a direction rearwards from said front transverse member and terminating at the opposite ends of the rear transverse member from which said lateral rear members directly extend downwards, said members being secured to form non-deformable triangular lattice structures ensuring a non-deformability of the framework of the parcel carrier and thereby inhibiting both lateral oscillation of the framework and roll.

2. A framework of a parcel carrier as claimed in claim 1, wherein the framework consists of metal rods.

3. A framework of a parcel carrier as claimed in claim 2, wherein said metal rods are aluminum metal rods.

4. A framework of a parcel carrier as claimed in claim 2, wherein said metal rods each have a round cross section.

5. A framework of a parcel carrier, said framework comprising: a substantially rectangular top frame formed of two mutually parallel lateral members, and a forward transverse member and a rear transverse member disposed mutually parallel to one another and extending at right angles and secured to said lateral members; a first U-shaped element consisting of a one-piece metal rod so as, to have a transverse part and parallel sides extending downwards from opposite ends of said transverse part, respectively, said transverse part constituting said forward transverse member of the top frame; a second U-shaped element consisting of a one-piece metal rod so to also have a transverse part and parallel sides, the transverse part of said second U-shaped element constituting said rear transverse member of the top frame, and the parallel sides, of said second U-shaped element extending downwards from opposite ends of the transverse part of said second U-shaped element to bottom ends of the parallel sides of said first U-shaped element and secured thereto, respectively; and two inner elements each extending from a central portion of said forward transverse member towards a respective one of the opposite ends of the transverse part of said second U-shaped element such that said two inner elements diverge from one another as said elements extend towards the opposite ends of the transverse part of said second U-shaped element, said elements being rigidly connected to form non-deformable triangular lattice structures.

6. A framework of a parcel carrier as claimed in claim 5, wherein the framework consists of metal rods.

7. A framework of a parcel carrier as claimed in claim 6, wherein said metal rods are aluminum metal rods.

8. A framework of a parcel carrier as claimed in claim 6, wherein said metal rods each have a round cross section.

9. A framework of a parcel carrier as claimed in claim 5, wherein the parallel sides of said first U-shaped member include means for attaching the framework to anchorages of a bicycle, respectively.

10. A framework of a parcel carrier as claimed in claim 5, and further comprising a third U-shaped element consisting of a one-piece metal rod so as to also have a transverse part and parallel sides, the transverse part of said third U-shaped element also constituting said forward transverse member and located between the transverse parts of said first and said second U-shaped elements, and the parallel sides of said third U-shaped element extending downwards from opposite ends of the transverse part of said third U-shaped element to said parallel sides of said second U-shaped element and secured thereto.

11. A framework of a parcel carrier as claimed in claim 10, wherein said two inner elements include parallel portions extending between central portions of said transverse parts of said first and said second U-shaped elements, and divergent portions extending from the transverse part of said third U-shaped element to opposite ends of the transverse part of said second U-shaped element.

* * * * *